United States Patent [19]

Kahaney

[11] Patent Number: 4,955,708
[45] Date of Patent: Sep. 11, 1990

[54] SUNGLASSES HAVING ADJUSTABLE TEMPLES

[76] Inventor: Alan Kahaney, 2212 Place Monaco, Del Mar, Calif. 92014

[21] Appl. No.: 340,700

[22] Filed: Apr. 20, 1989

[51] Int. Cl.⁵ .......................... G02C 7/10; G02C 5/20
[52] U.S. Cl. ........................................ 351/44; 351/118
[58] Field of Search .................. 351/52, 118, 44, 122, 351/114, 117, 119, 121

[56] References Cited

U.S. PATENT DOCUMENTS

| | | | |
|---|---|---|---|
| 2,341,233 | 2/1944 | Norton | 351/118 |
| 2,393,837 | 1/1946 | Swanson | 351/52 |
| 2,443,249 | 6/1948 | Jackson | 351/118 |
| 2,721,498 | 10/1955 | Gerson | 351/118 |
| 3,402,005 | 9/1968 | Liautaud et al. | 351/122 |
| 4,012,130 | 3/1977 | Guillet | 351/118 |
| 4,670,915 | 6/1987 | Evans | 351/118 |

Primary Examiner—Rodney B. Bovernick
Attorney, Agent, or Firm—Charles C. Logan, II

[57] ABSTRACT

The novel sunglasses have temple assemblies that are adjustable to fit the heads of different persons. Each temple assembly has an elongated member having a sleeve portion at its rear end. A plurality of apertures are formed in the sleeve portion on its inner surface. A leg having a head portion configured to telescopically mate with the sleeve portion is removably inserted therein. The inner surface of the head portion has a plurality of protrusions that mate with the respective apertures on the inner surface of the space portion. This allows the temple assembly to be adjusted to multiple lengths. The leg member has a flexible wire core extending its length that allows its ear engagement portion to be bent to various configurations in order to closely engage the ear of the wearer. The brow bar is detachably received on the top edge of the single curved lens of the sunglasses which allows brow bars of various colors to be interexchanged.

3 Claims, 1 Drawing Sheet

SUNGLASSES HAVING ADJUSTABLE TEMPLES

BACKGOUND OF THE INVENTION

The invention relates to glasses and more specifically to sunglasses having adjustable length temple assemblies and which have legs that can be bent to insure snug ear engagement.

Presently one of the problems that exist with sunglasses is the fact that they are mass produced with temples having a fixed length. Since peoples heads are of different sizes and shapes, often the length of the temple of the sunglasses is either too long or too short. What has been needed are temple members whose length can be adjusted.

Another problem that presently exists is the fact that sunglasses are presently being used by people participating in sports. The active nature of these activities oftentimes causes the glasses to either fall off the wearer or to travel from their desired wearing position. What has been needed are temples that have structure which allow them to be molded to the configuration of the wearers ear so that they will stay in a fixed position and also not be knocked off.

It is an object of the invention to provide novel sunglasses that have adjustable temple assemblies so that they can be individually fit for different persons.

It is also an object of the invention to provide novel sunglasses that have a portion of the temple members designed so that they can be bent to snuggly conform to the wearers ears.

It is another object of the invention to provide novel sunglasses that are economical to manufacture and market.

SUMMARY OF THE INVENTION

Applicant's novel sunglasses have been designed to overcome problems that have existed with prior sunglasses. The basic problems that they solve relate to individually custom fitting the length of the temple members to the individual and also bending the rear end of the temple members to conform to the configuration of the wearer's ear.

The novel temple assemblies have an elongated member having a sleeve portion formed in its rear end. The sleeve portion has a plurality of apertures formed on its inner surface. A leg member having a head portion is telescopically received in the sleeve portion. A plurality of protrusions are formed on the inner surface of the head portion and these matingly engage in the apertures found in the sleeve portion. This allows the length of the temple assembly to be custom fit to the wearers head.

The leg assembly has a flexible wire core extending throughout its entire length. This wire is surrounded by a wall thickness of bendable material such as rubber. The ear engagement portion of the wire can thus be bent to conform to the configuration of the wearer's ear to give a snug fit thereto.

DESCRIPTION OF THE PREFERRED EMBODIMENT

Figure 1:
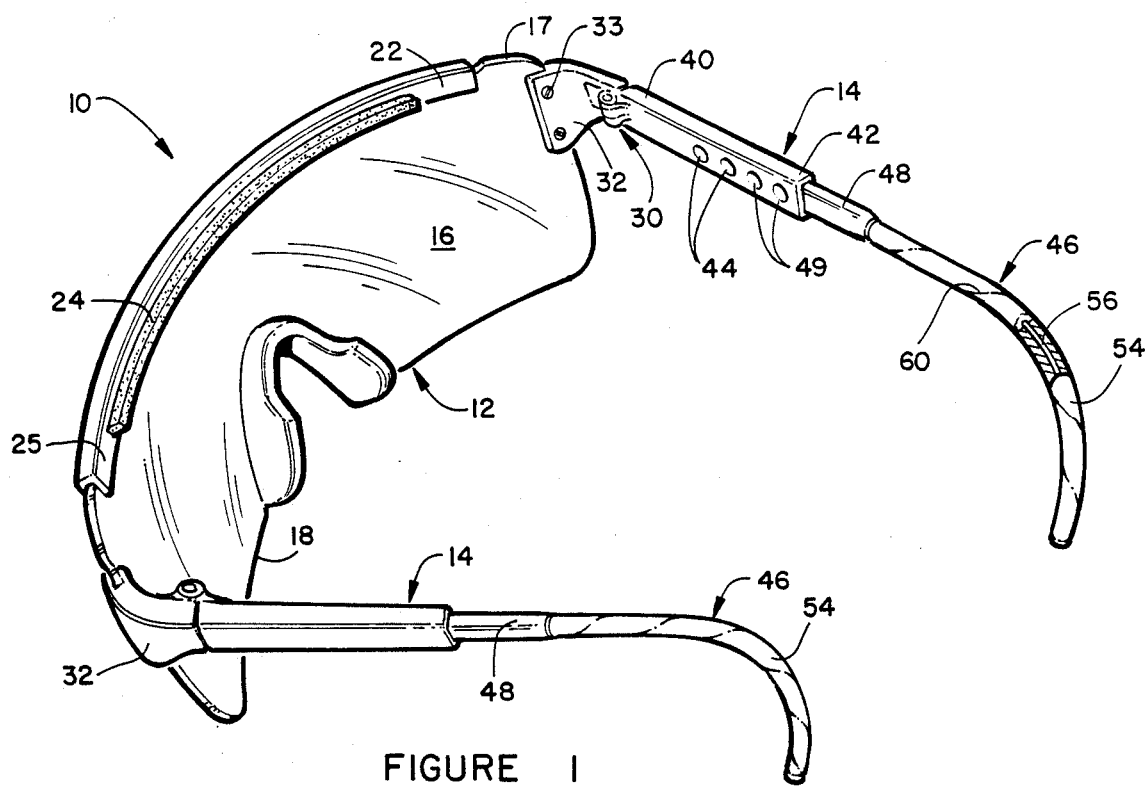
FIG. 1 is a rear perspective view of applicant's novel sunglasses.
Figure 2:
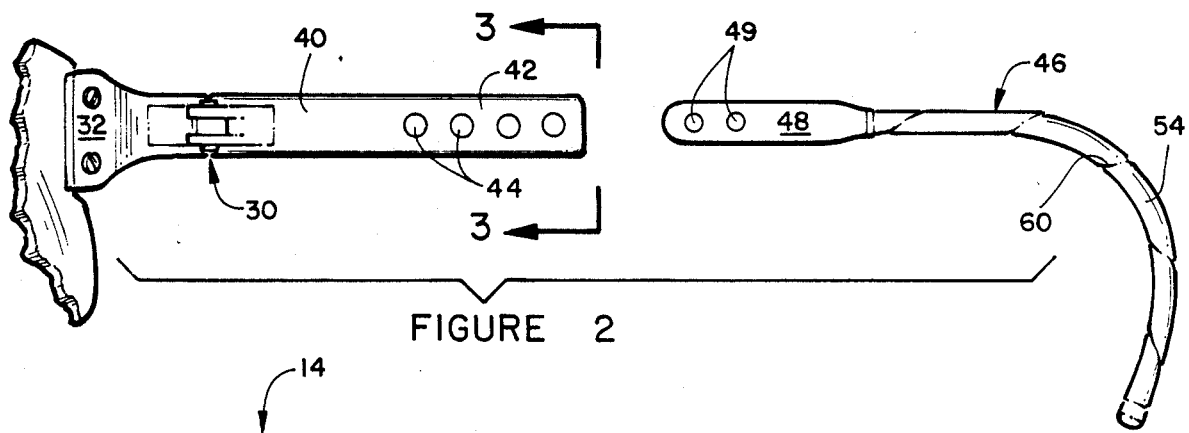
FIG. 2 is an exploded side elevation view of the temple assembly.
Figure 3:
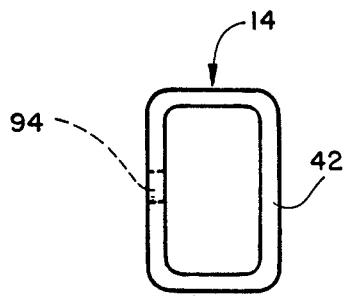
FIG. 3 is a rear elevation view taken along lines 3—3 of FIG. 2.

Applicant's novel sunglasses will now be described by referring to FIGS. 1-3 of the drawing. The sunglasses are generally designated numeral 10.

Sunglasses 10 have a sunglasses lens assembly 12 and a pair of temple assemblies 14.

Sunglasses lens assembly 12 has a single curved lens 16 having a top edge 17 and a bottom edge 18. A nose guard 20 is attached to bottom edge 18. A brow bar 22, preferably made of flexible plastic material, is detachably secured to top edge 17. It has a cushion strip 24 secured to the inner wall surface 25 of brow bar 22. The wearer of the sunglasses may have a number of brow bars in different colors so that he may interchange them according to his personal color mood.

Temple assemblies 14 have their front ends attached by hinges 30 to temple brackets 32. The temple brackets in turn are secured by screws 33 to the respective left and right ends of the lens 16.

Temple assemblies 14 are formed from elongated members 40 having a sleeve portion 42 formed at their rear end. A plurality of apertures 44 are formed in the inner surface 45 of sleeve portion 42. Leg members 46 have a head portion 48 formed at their front end having a plurality of protrusions 49 extending from their inner surface 50. Leg members 46 also have an ear engaging portion 54. A bendable cylindrical wire core 56 extends throughout the length of leg member 46 and it is surrounded by a sleeve of bendable of material such as rubber. A plurality of spiral annular grooves 60 are longitudinally spaced along leg member 46 from head portion 48 to its rear end. 9n

What is claimed is:

1. Sunglasses having adjustable temple assemblies comprising:

a sunglasses lens assembly having a right end and a left end;

a pair of temple assemblies each having a front end and a rear end;

means for attaching the front ends of the respective temple assemblies to the respective right and left ends of said sunglasses lens assembly;

said temple assemblies each having means for adjusting their length to conform to different sized heads comprising each of said temple assemblies having an elongated member having a front end and a rear end, the rear end of said elongated member having a sleeve portion that also has an inner surface, a plurality of apertures in said inner surface at longitudinally spaced intervals, a leg member having a head portion and an ear engagement portion, said head portion having an inner surface having a plurality of protrusions that are matingly received in the apertures of said sleeve portion; and said temple assemblies each having means for adjusting the manner in which they engage the wearer's ears comprising said ear engagement portion having a front end and a rear end, said ear engagement portion of said leg having a bendable cylindrical wire core extending longitudinally throughout its length from its front end to its rear end and being surrounded by a sleeve of bendable material having an outside surface with a plurality of longitudinally spaced annular grooves formed therein, these annular grooves provide points for bending said ear engagement portion into a configuration that grips the ears of the wearer.

2. Sunglasses as recited in claim 1 wherein said wall of bendable material is made from rubber.

3. Sunglasses are recited in claim 1 wherein said sunglasses lens assembly comprises a single curved lens having a top edge and a bottom edge, a brow bar having a predetermined color is removably received on the top edge of said lens, said brow bar having an inner wall surface having an elongated cushion strip adhered thereto.

* * * * *